United States Patent

Schwarz

[11] Patent Number: 5,689,639
[45] Date of Patent: Nov. 18, 1997

[54] METHOD AND APPARATUS FOR UPDATING AND TRANSMITTING LINE-ORIENTED DATA SETS

[75] Inventor: Siegfried Schwarz, Boeblingen, Germany

[73] Assignee: International Business Machines Corporation, Armonk, N.Y.

[21] Appl. No.: 450,054

[22] Filed: May 25, 1995

[30] Foreign Application Priority Data

Oct. 29, 1994 [EP] European Pat. Off. ............ 94117136.5

[51] Int. Cl.[6] ................. G06F 3/00; G06F 5/00; G06F 7/00; H03M 7/00
[52] U.S. Cl. ................. 395/200.01; 395/200.03; 395/200.09; 395/200.18; 395/286; 341/51; 341/55
[58] Field of Search ............... 395/200.01, 200.09, 395/200.03, 155, 200.18, 286, 309, 613, 614, 615; 341/51, 55; 380/25; 358/263, 261.1

[56] References Cited

U.S. PATENT DOCUMENTS

| | | | |
|---|---|---|---|
| 4,499,499 | 2/1985 | Brickman et al. | 358/433 |
| 4,612,532 | 9/1986 | Bacon et al. | 341/51 |
| 4,679,094 | 7/1987 | Rrtherford | 358/251.1 |
| 5,179,378 | 1/1993 | Ranganathan et al. | 341/51 |
| 5,179,652 | 1/1993 | Rozmanith et al. | 395/331 |
| 5,229,768 | 7/1993 | Thomas | 341/51 |
| 5,361,393 | 11/1994 | Rossillo | 395/200.01 |
| 5,390,247 | 2/1995 | Fischer | 380/25 |
| 5,438,671 | 8/1995 | Miles | 395/200.01 |
| 5,521,597 | 5/1996 | Dimitri | 341/51 |

*Primary Examiner*—Parshotam S. Lall
*Assistant Examiner*—Bharat Barot
*Attorney, Agent, or Firm*—Joscelyn G. Cockburn

[57] ABSTRACT

A method for the transmission of line-oriented data sets. This method employs two data set structures which keep the images of the data sets at different time stages and which are filled alternatingly with the data sets. The method allows to determine updates of the data sets and avoids re-transmission of old information. In particular, moved lines are detected in a very effective manner. As a result, high update rates with low amounts of transmitted data are achieved. The method is suitable for local terminal sessions employing text or raster graphic terminals, which have to be operated from a remote site.

20 Claims, 7 Drawing Sheets

```
┌─AMBIGUITY─────────────────────────────────────┐
│                                               │
│  COLUMN    :   1    2    3    4    5   6   7   8  ...                │
│  TEXTLINE  :   S    H    E    I    L   A  ←──────── 21              │
│  ASCII     :  53   68   65   69   6C  61  20  20  ...               │
│                    ‖    ‖                                            │
│  HASH VALUE :       0X6865 ←──────── 20                              │
│                                                                      │
│  TEXTLINE  :   S    H    E    L    M   A  ←──────── 22              │
│  ASCII     :  53   68   65   6C   6D  61  20  20\ ...               │
│                    ‖    ‖                                            │
│  HASH VALUE :       0X6865                                           │
│                                                                      │
└──────────────────────────────────────────────┘
                    FIG. 3
```

PREVIOUS SCREEN — 31

| SCREEN IMAGE | HASH VALUES | CHANGE FLAG |
|---|---|---|
| HARRY | 0X6172 | |
| SALLY | 0X616C | |
| BRUCE | 0X7275 | |
| SHEILA | 0X6865 | |
|  | 0X2020 | |
|  | 0X2020 | |
|  | 0X2020 | |
|  | 0X2020 | |
|  | 0X2020 | |

CURRENT SCREEN — 30

| SCREEN IMAGE | HASH VALUES | CHANGE FLAG |
|---|---|---|
| BRUCE | 0X7275 | 1 |
| SHEILA | 0X6865 | 1 |
| JACKIE | 0X6163 | 1 |
| KYLIE | 0X796C | 1 |
|  | 0X2020 | 0 |
|  | 0X2020 | 0 |
|  | 0X2020 | 0 |
|  | 0X2020 | 0 |
|  | 0X2020 | 0 |

ZEROED SCREEN — 37

| SCREEN IMAGE | HASH VALUES | CHANGE FLAG |
|---|---|---|
| <ZEROED OUT> | 0X0000 | |
|  | 0X0000 | |
|  | 0X0000 | |
|  | 0X0000 | |
|  | 0X0000 | |
|  | 0X0000 | |
|  | 0X0000 | |
|  | 0X0000 | |
|  | 0X0000 | |

```
COLUMN                :    0 0 0 0 0 0 0 0 0 0 1 1 1 1 1 1 1 1 1 1 2 2 2 2 2 2 2 2 2 2 3
                           1 2 3 4 5 6 7 8 9 0 1 2 3 4 5 6 7 8 9 0 1 2 3 4 5 6 7 8 9 0

LINE IN PREVIOUS IMAGE :    F I L E N A M E :  _ _ _ _ _ _ _ _ ( * * S R C * * )         ←— 50
LINE IN CURRENT IMAGE  :    F I L E N A M E :  A A B C 2 2 2 2 _ ( * * S R C * * )
```

METHOD AND APPARATUS FOR UPDATING AND TRANSMITTING LINE-ORIENTED DATA SETS

The present invention relates to a method for the transmission of data sets between two line-oriented data processing units, e.g. line-oriented terminal displays, in order to get quick updates of the data set of the receiving site unit with respect to the data set of the transmitting site unit. Further, the invention concerns the application of the method to text mode and raster graphic terminals.

Local line-oriented data sets like terminal display screens, often have to be operated from a remote site. 'Remote' could mean anything between a few meters and inter-continental, connected via LANs or via modems across telephone lines or via satellite links. Therefore the screen image of the local display has to be sent to the remote site and to be recreated there giving screen updates.

As the available transmission rate for data transfer is often very low for the above reasons, it is necessary to optimize the data that is transmitted to the remote site in order to get an update delay and an update frequency at the remote site within bearable limits.

A possible solution is to use standard data compression software. In the IBM Technical Disclosure Bulletin, Vol. 32, No. 5A, page 94, an algorithm for compressing ASCII data using a character encoding scheme is disclosed. Display data is to be transmitted over phone lines at relatively slow speeds for real-time updates of a remote display. Minimizing the amount of transmitted data is achieved by compressing small amounts of data, representing changes in a remote computer's display screen. The changes are compressed by a nibble-based encoding scheme which uses short bit strings to represent more frequently used characters and longer bit strings for less frequently used characters.

As another approach in the prior art, from the IBM Technical Disclosure Bulletin, Vol. 32, No. 4B, page 100, a method of eliminating transmission of excessive display data is known concerning remote control telephone access to a host computer by mirroring the host's display screen. There a display monitor periodically makes a copy of a host's display buffer and compares it with the display screen of a remote computer. The data is analyzed to find changes that have occurred. The data that has changed is enqueued to be sent to the remote computer as a display update. It is the basic intention of this method to avoid problems in a situation where major changes occur on the host's display screen. Therefore, a frequent check of the display buffer is made to determine, if a major change has occurred. If there has been a major change to the screen and there is a lot of display data queued, the queue is purged and the current screen is sent to the remote site.

A common disadvantage of the approaches of the prior art described above is that those methods do not render data transmission rates which are required for very low update delays and very high update frequencies at the receiving site. In contrast, it is desired to achieve nearly simultaneously updating at the receiving site.

It is therefore an object of the present invention to improve the data transfer between line-oriented data processing units, e.g. terminal display sreens, screen buffers, data storages or other kinds of data processing units which support line-oriented data sets, which are separated by any sort of telecommunication links, where these links allow only a very low data transfer rate. In particular, high speed updating rates of remote consoles have to be achieved.

This problem is solved with a tailor-made method for line-oriented data processing units by minimizing the amount of the transmitted data. The data processing units comprise at least two storage means, which keep the state of the data sets that have to be transmitted at two different times and are filled alternatingly and continuously with data sets. At least one of the data sets stored in one of the two storage means, respectively, is analyzed line by line to locate changes of the data set at the transmitting site, e.g. identical and moved lines, lines containing repetitive data within the lines and comparing the remaining lines with corresponding lines of the other data set in order to locate changed lines or changed parts of a line. Thereupon, it is searched for moved lines within one data set, if mismatching lines at the same line position in each of the data sets, respectively, are found. According to the teaching of the invention, only the result of the analysis is transmitted, but not the data itself. By reason of only transmitting the results of this analysis, a considerable reduction of the volume of transferred data is already achieved. Beyond this, at each analyzing step conventional compression techniques can be applied to lead to further compression of the transferred data.

The method employs two sets of data structures which keep the images of the data set which is to be transmitted. Filling those two structures alternatingly, the method can determine the updates of the data set and does not need to re-transmit any old information. Due to the combination of detection of changes and reduction a higher update frequency is achieved.

If identical or moved lines or repetitive data within the lines are found, then only the results of this analysis are transmitted. Besides detection of actually moved lines within the data set, duplicate lines in the data set are also detected. In contrast to the prior art, detection of changes and reduction of data are not carried out by successive steps. On the contrary, reduction takes place already within or directly after the detection of changes.

The storage means at the receiving site is also employed effectively to the reconstruction of unchanged lines at the receiving site.

In the preferred embodiments the analysis of changes can be drastically speeded up by the employment of hash values. In that way the method can quickly find out which line was definitely changed.

Further data reduction can be achieved by combining consecutive matching lines both as blocks at the transmitting site and at the receiving site.

In order to achieve higher reliability of the method with respect to the loss of data, in the preferred embodiment the transmitted data packets contain carry sequence numbers. By this procedure sequentially transmission of updated data sets within e.g. a computer network is safe. Should a data packet be lost, a sequence number mismatch occurs and a resend of a minimized full data set is requested from the transmitting site for re-synchronization.

In the following part preferred embodiments of the invention are described in more detail with reference to the drawing in which.

Figure 1:
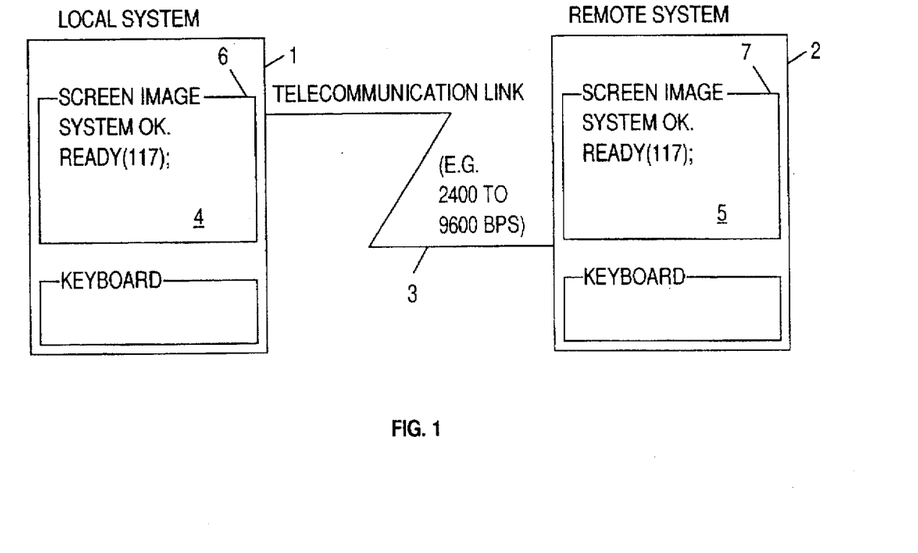
FIG. 1 is a schematic representation of a remote control system according to the invention.

FIG. 1 exemplary shows an application of the present invention to a local terminal session 1 that is to be operated from a remote site 2 wherein a telecommunication link 3 allows only a relatively low data transmission rate of 2400 to 9600 bps (bits per second). The two systems 1, 2 employ two line-oriented terminals 6, 7 e.g. an operator console and a host computer. The line-oriented data sets are represented by the screen images 4, 5 of the two terminals 6, 7.

The method employs two sets of data structures 16, 17, 18, 19 at the local 14 and the remote site 15, respectively, which keep these screen images 10, 11, 12, 13 (FIG. 2) whereby the screen images 10, 11 at the local site and the ones at the remote site 12, 13 reflect the state of the screen images at different time stages, respectively. Those respective two structures 16, 17, 18, 19 are filled alternatingly. In this way the method is able to determine screen updates and does not need to re-transmit any old information from the local site 14 to the remote site 15. Actually there is a third such structure 37 (FIG. 4) used for creating a one hundred percent update information for the remote site 15 for initializing its screen before it starts to work with the update information only (not shown). This third structure 37 is zero-filled and then used once as the previous image to create the full information for the remote site 15 using the very same method.

Figure 2:
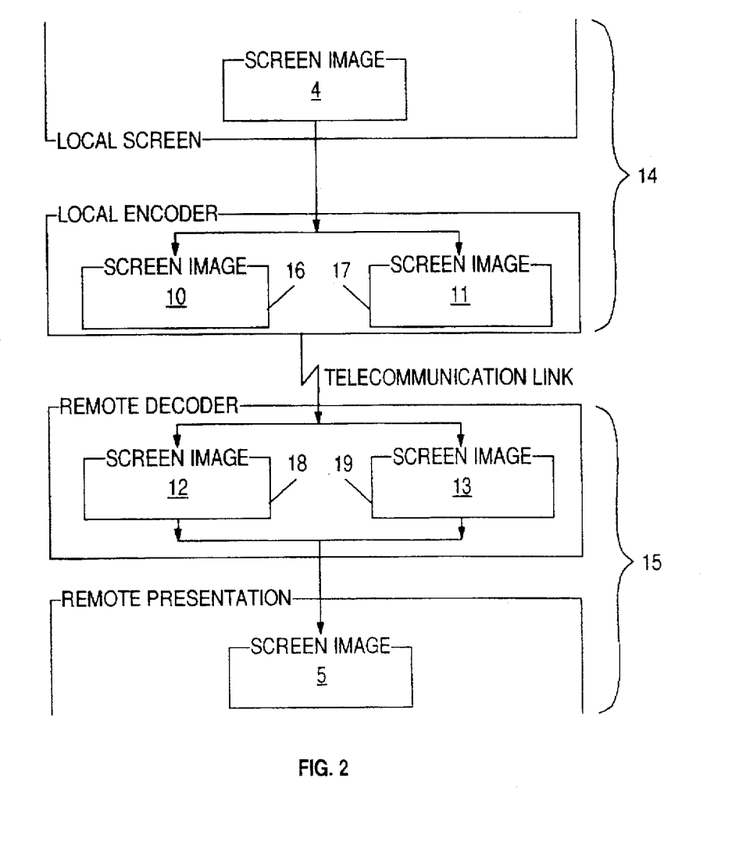
FIG. 2 shows the data-flow according to a preferred structure of the present invention.

More detailed the method analyzes the screen image e.g. at a later time stage or compares both screen images at different time stages in order to detect one or more of the following features in the screen images 10, 11, 12, 13:

The range of blank lines i.e. lines which only consist of blank characters;

the range of moved lines i.e. identical lines to be found at different line positions;

unchanged lines i.e. identical lines at the same line position in both screen images;

unchanged parts of a line at the same line position and/or repetitive characters i.e. consecutive characters comprising the same attributes within a line.

These steps of the method are executed on the local i.e. the transmitting site whereby the screen image 11 reflecting the later time stage is investigated in order to locate e.g. blank lines, moved lines and repetitive characters and the two screen images 10, 11 are compared with each other in order to find unchanged lines and unchanged parts of a line. It is emphasized that these method steps can be used in a different manner particulary with respect to their sequence.

Figure 3:
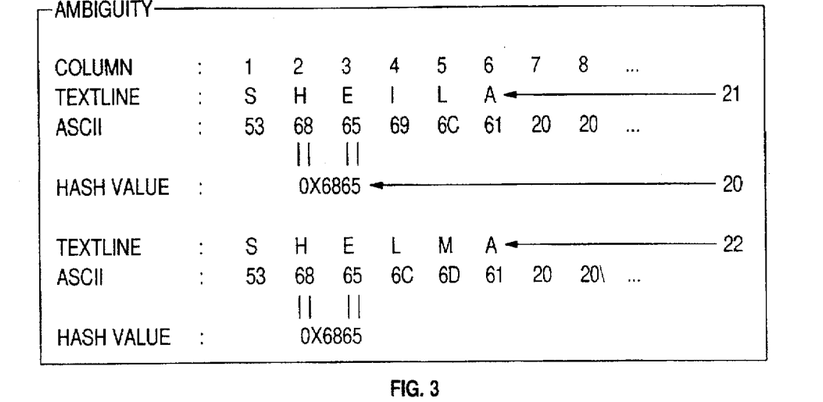
FIG. 3 shows an example of line comparison by hash values.

In order to speed up line comparisons hash values 20 are employed wherein these values are computed for each line 21, 22. This is realized by taking out a few adjacent characters somewhere near the beginning of the line 21, 22 or in a similar way. In a preferred embodiment, the method puts five sets of four characters each in machine words and adds them up. In the example to be seen in FIG. 3 the character codes (e.g. ASCII or EBCDIC) of the second and third column are used to form a 16-bit hash value 20. Because those hash values 20 cannot be unambiguous they only indicate where the lines can possibly be the same or where the lines definitely differ from each other. In order to definitely know that lines are identical, it is necessary to do a comparison of the whole lines.

Figure 4:
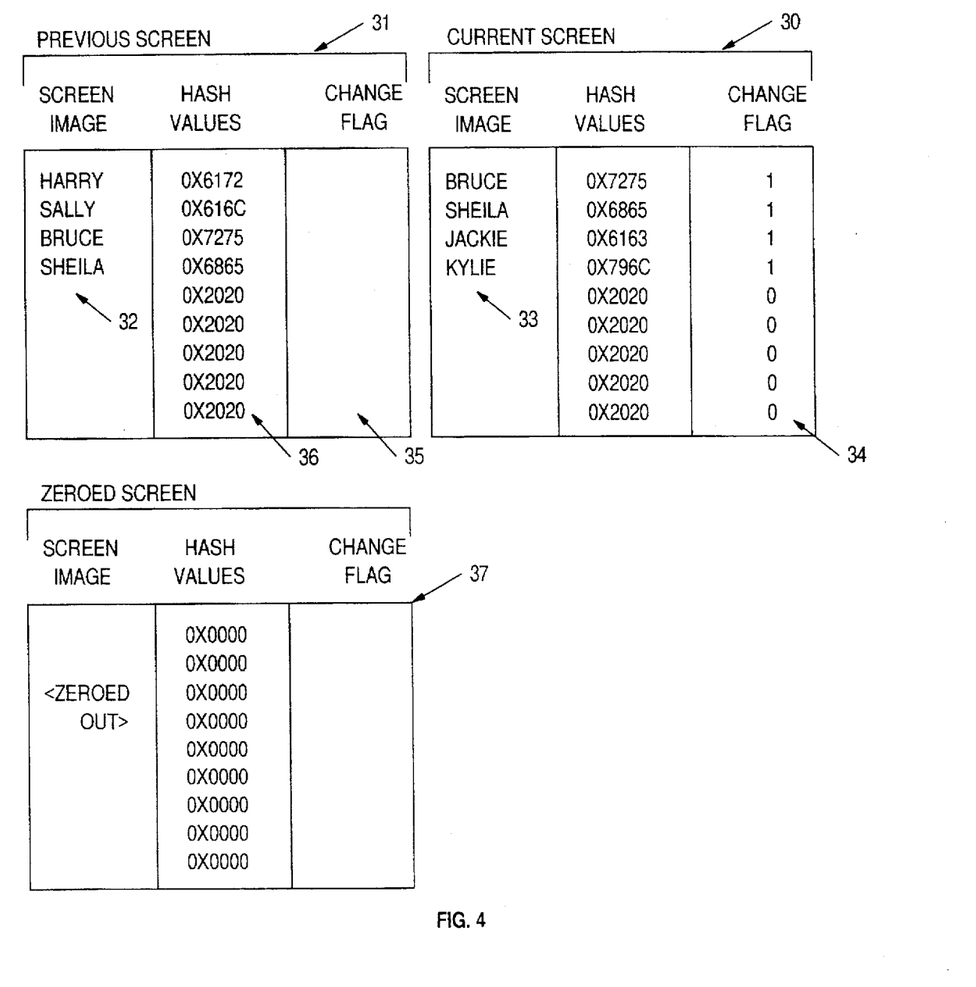
FIG. 4 shows typical data structures used by the method with example data.

In FIG. 4 data structures used by the method with exemplary data are shown. The current screen 30 originated from the previous screen 31 by scrolling up the screen's contents 32, 33 by two lines and then adding two new lines below the old ones.

As the method generally does not create or transmit information about unchanged lines, it exploits so-called change flags 34, 35 which are associated with each line. Unchanged lines are just skipped when processing a new screen image wherein the decoding method takes the line's contents from the previous screen image which has been built before.

In contrast, when a changed line gets processed, first a check is made whether the line is blank. If it is blank the method checks whether adjacent lines are also blank and in this way creates information for a block of blank lines rather than blocks of information of single blank lines in order to reduce the extent of the transferred data.

If a line is not blank, the next step is to check whether a "changed" line is contained in the previous screen already. For this, the method scans the previous image 32 for a matching hash value 36. If it finds one, the corresponding lines in the current 33 and the previous image 32 are compared character by character due to the ambiguity of the hash values. Again, if one or more consecutive moved lines are found in the previous image 32, the method tries to create a single block of information for a block of those moved lines rather than creating a block of information for every single line.

In the same manner, the method can generate multiple blocks of information for duplicate lines in the new image 43 when they have at least one occurrence in the previous image 32, 40. The example according to FIG. 5 clarifies that, wherein each box 41, 42 designates a screen. In this example, new duplicate line(s) on the screen 42 are shown. Here lines "2" and "0" in the current image 43 seem to originate from line "1" in the previous screen image 40. Lines "3", "4" and "5" seem to have been moved up by two lines.

Figure 5:
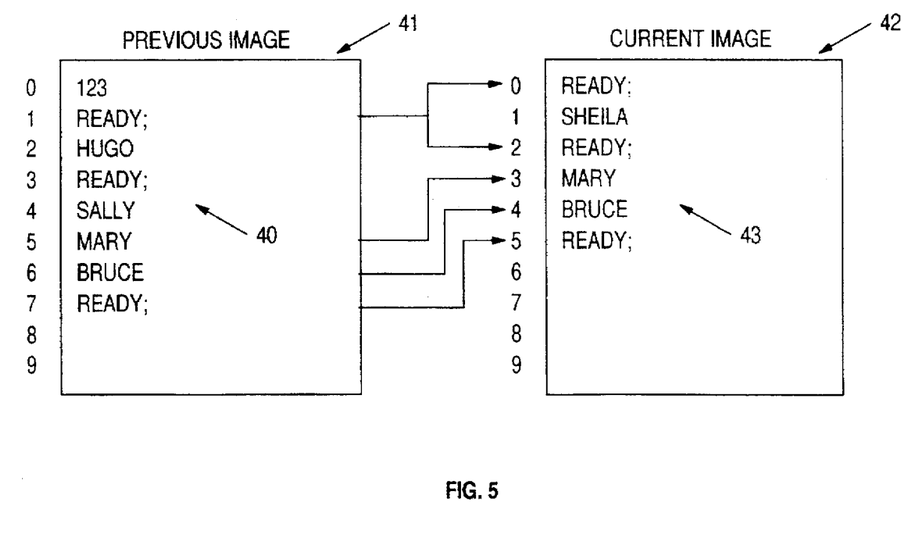
FIG. 5 shows a preferred embodiment of the invention where the method is generating blocks of information for duplicate lines and for moved lines.
Figure 6:
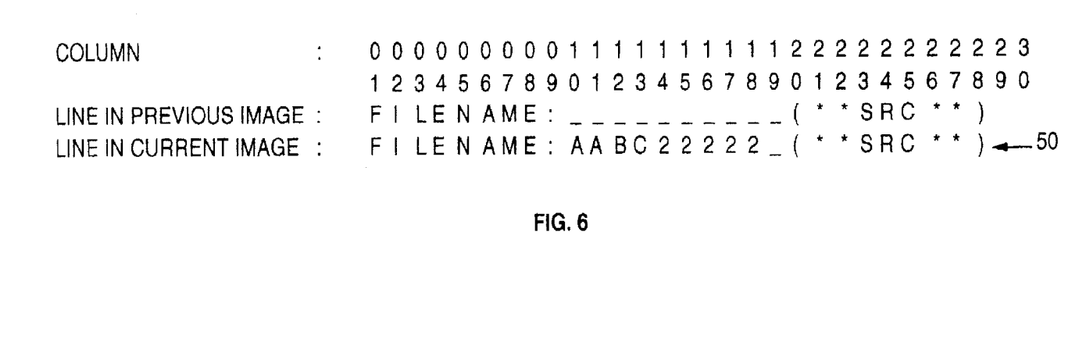
FIG. 6 is an example of encoding a new respectively changed line.

Lines in the current image 43 which are not found in the previous image 40 are then encoded as new lines. When a new line gets encoded before the transmission to the remote site 2, 15 the method also checks for parts of the line which are identical in the previous image 32, 40 and for repetitive characters like "*******". Whenever the overhead imposed by encoding these facts is worth to be spent, this information gets encoded. For all other cases including changed data, the data that is in the line is encoded. This is clarified by FIG. 6, showing an example of encoding a new respectively changed line 50.

The method can be also applied to analyzing screen updates with graphic image screens. Text mode terminals usually comprise an array of characters to be displayed like 25 rows by 80 columns each. Graphic screens have a similar organization of the information to be displayed. Where there are lines of characters with text mode terminals, there are lines of pixels with graphic screens. In both cases the information array consists of an array of bytes. Depending on the implementation, both single pixels and single characters as well, could be represented in more than a single byte, e.g. when using double byte character sets or where more than 256 different colors are needed. Pixels could also be represented by units that are smaller than bytes like four bits when 16 colors are needed only.

Thus, there is not much difference between processing text screens and processing graphics screens. Generally the same method can be used. The only exception is that the number of rows and columns usually is much bigger with graphics screens. For performance reasons the method should be tailored to meet the slightly different requirements.

Where text screens comprise such typical things like blank lines, graphic images have different characteristics. The method applied to graphic images detects the following:

Range of lines that are filled with pixels that are all one color;

range of moved lines;

unchanged lines;

unchanged parts of a line and/or ranges of a line with pixels that are all one color.

Some features are to be implemented to speed up the method. For simplification, the following description of a possible implementation is based on each pixel to be represented as a single byte (256 different colors possible). But there are other embodiments of the invention conceivable.

To find out whether a pixel line is a possible candidate at all for a line with all pixels having the same color, the method takes a few samples from the pixel line. One way to do this is to get a single pixel's value from somewhere in the pixel line, fill a whole machine word (four bytes-typically) with that value, take a few samples of the size of a machine word from the pixel line and compare those samples with a value obtained initially.

Figure 7:
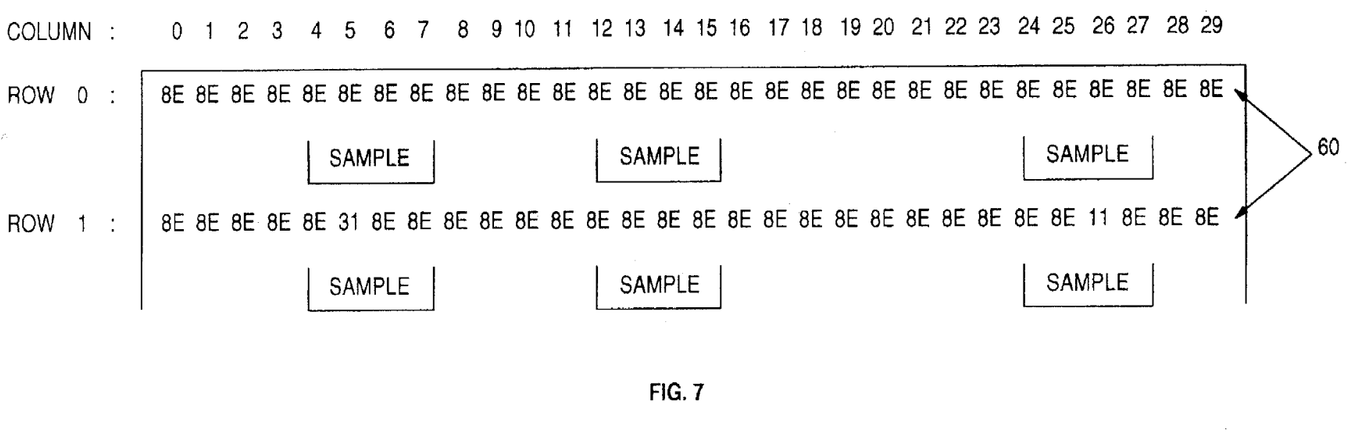
FIG. 7 shows the method of the present invention applied to graphic-like data.

In FIG. 7 an example is shown for this method in order to locate monochromatic lines 60. For checking row "0" a sample is taken in column "2" obtaining the pixel value 0×8E (notation of hexadecimal values is in C-language syntax). From this pixel value a reference word full of the pixel's value is built 0×8E8E8E8E (machine word size). Now the machine word sized samples at column 4, 12 and 24 are taken for instance and compared giving the result, that all samples have the same pixels (color). So this line could be a candidate with pixels all in one color. Now a quick comparison of the whole line is done and the reference word obtained previously is used for doing this as much as possible. A possible remainder of a line is checked pixel by pixel. If all pixels are matching with the reference word (resp. the reference pixel), then this line consists of pixels all in one color.

Now, for checking row 1, a sample in e.g. column 2 is taken again and a reference word full of that pixel's value is built giving 0×8E8E8E8E (machine word size). Now the machine word sized samples at column 4, 12 and 24 for instance are taken again and compared. This leads to a mismatch with the sample taken at column 4 (and with the sample taken at column 24). This line cannot be a candidate with pixels all in one color. Some pixels do not match with the reference word leading to the result that this line does not consist of pixels all in one color.

For the detection of moved ranges of lines with the text mode method first it is searched for whether the current line of the new image is to be found in the previous image. Then successive lines in both images are checked to find the end of the range of those moved lines.

To speed up finding the current pixel line in the previous image it may be of advantage to begin searching from the current line's position in the previous image towards the top of the previous image and then, if still not found, from said starting position down to the bottom of the previous image. To speed up finding the end of a moved range of pixel lines it may be worth not to use linear search but binary search instead.

Hash values can be obtained in a similar way as in the text mode method.

Unchanged lines again must have identical hash values in both, the current and the previous image and must match exactly. In case change flags are supported, comparison can be avoided. Lines where a possible change flag is off, are unchanged. Unchanged parts of a line are detected as with the text mode method.

Detecting ranges of pixels in a line that are all one color is similar to detecting repetitive characters in a text line with the text mode method.

Figure 8A:
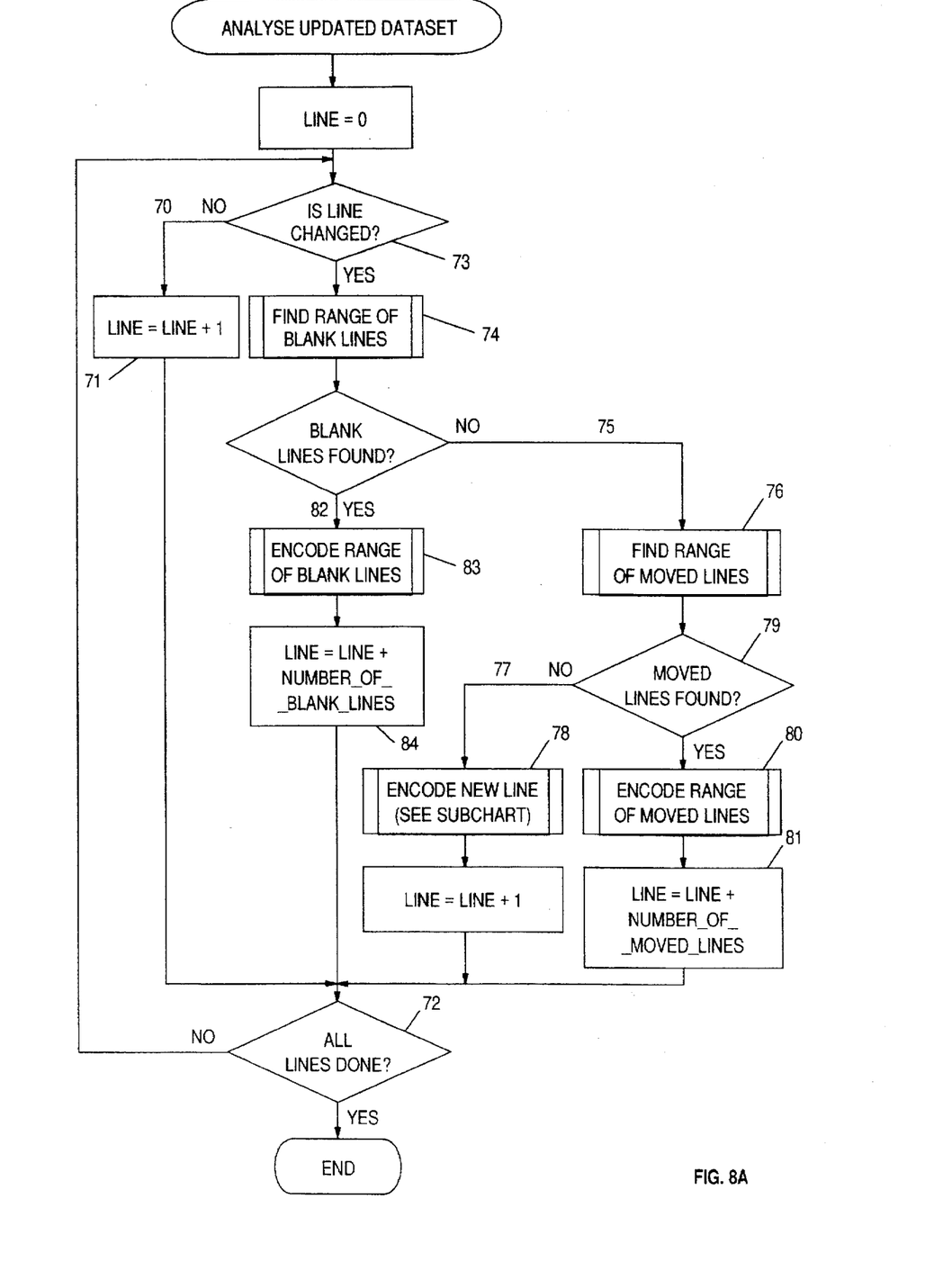
FIG. 8A illustrates the methods of processing an update of a screen image and encoding of new lines by means of flow-charts.
Figure 8B:
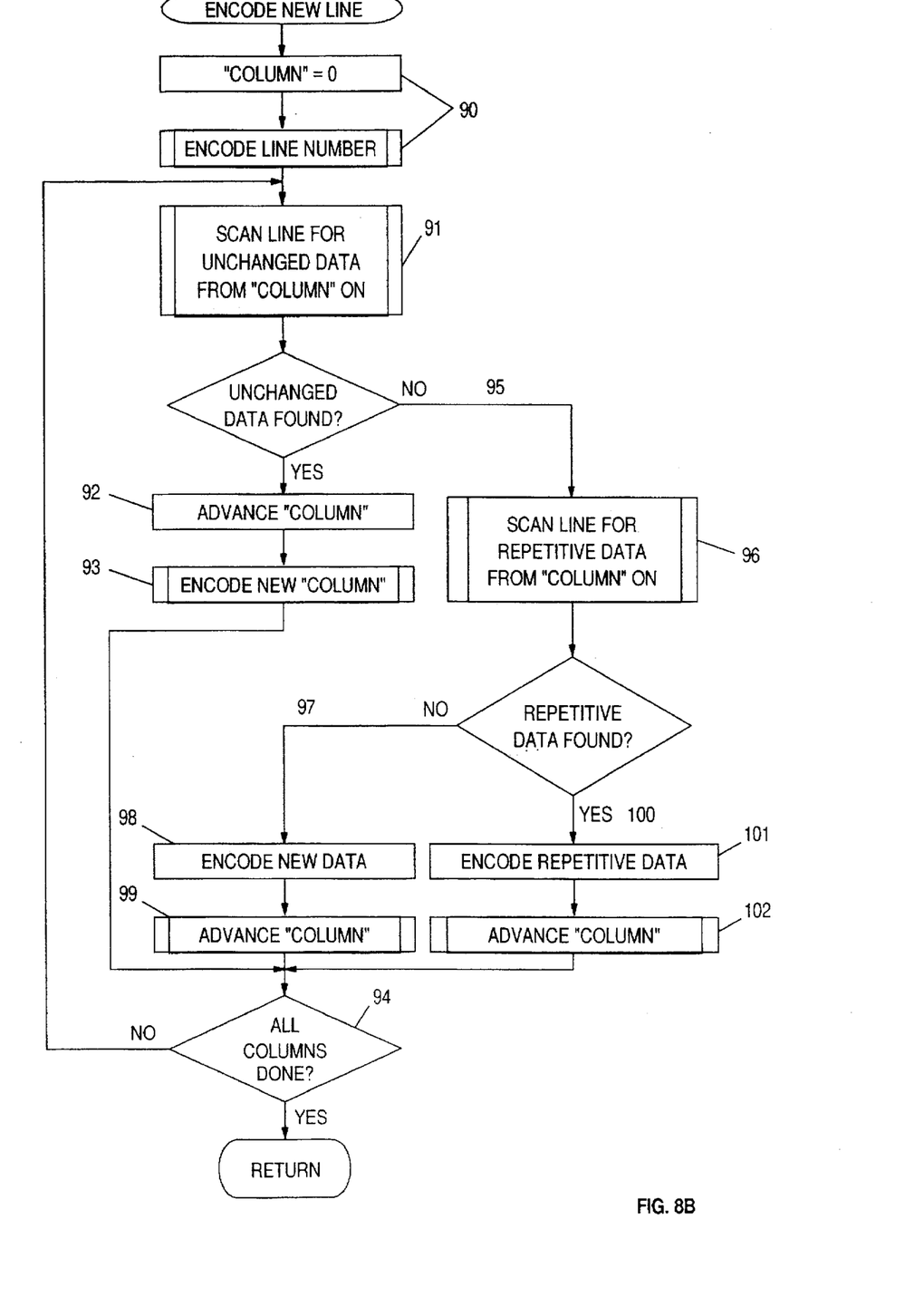
FIG. 8B illustrates the method of processing an update of a screen image and encoding of new lines by means of flow-charts.

FIGS. 8a and 8b show flow-charts of a preferred embodiment of the method according to the invention comprising most of the aforementioned features, but without detailing the actual encoding of new lines.

In particular, FIG. 8a illustrates the analyzing of the updated data set at the transmitting site. The data sets of the two storage means each keeping the state i.e. image of the data set at two different time stages are analyzed line by line starting with the top line (line 0). If the comparison of the two data sets results in that this line was not changed during the update 70 then the consecutive line (line 1) is analyzed in the same manner 71. This method is continued until the maximum number of lines 72 is reached. If a changed line is detected 73 then this line is analyzed in order to locate blank lines i.e. ranges of blank lines 74.

If no blank lines are found 75 then in a next step lines in the previous image which are identical to this line i.e. moved lines are searched for 76. Having not detected such moved lines 77 this changed line 73 is encoded as a new line 78. Otherwise 79, the moved lines are only encoded as a "range of moved lines" 80 and analysis is continued behind those moved lines 81.

If blank lines are found 82 only the "range of blank lines" is encoded 83 with respect to the transmission of the data and further analysis is continued behind those blank lines 84.

With regard to FIG. 8b a preferred embodiment of the partial method of "encoding as a new line" (78 in FIG. 8a) is illustrated. At this stage of the analysis, in general, changes within a specific line are searched for. As information for "encoding as a new line" a variable "column" is initialized to "0" 90. The line is scanned from column "0" on in order to find unchanged data 91 between the two stored sets of data.

If unchanged data was found the column variable is advanced to address data behind this unchanged part 92 and this new value of "column" is encoded for transmission 93. These steps are repeated until all columns of the line are analyzed 94.

If no unchanged data was found 95 then this line is scanned for repetitive data 96.

If no repetitive data was detected then the part of the line is encoded as "new data" 99 and the column variable is advanced to address data behind this "new data". Otherwise 100, repetitive data is encoded as "repetitive data" 102 and the column variable is advanced to address data behind the "repetitive data".

This whole procedure ends with the end of a line indicated by having analyzed all columns 94.

For the transmission of the updated data set to the receiving site only the result of the analysis is transferred and when moved lines are found/detected only information about their position.

Figure 9:
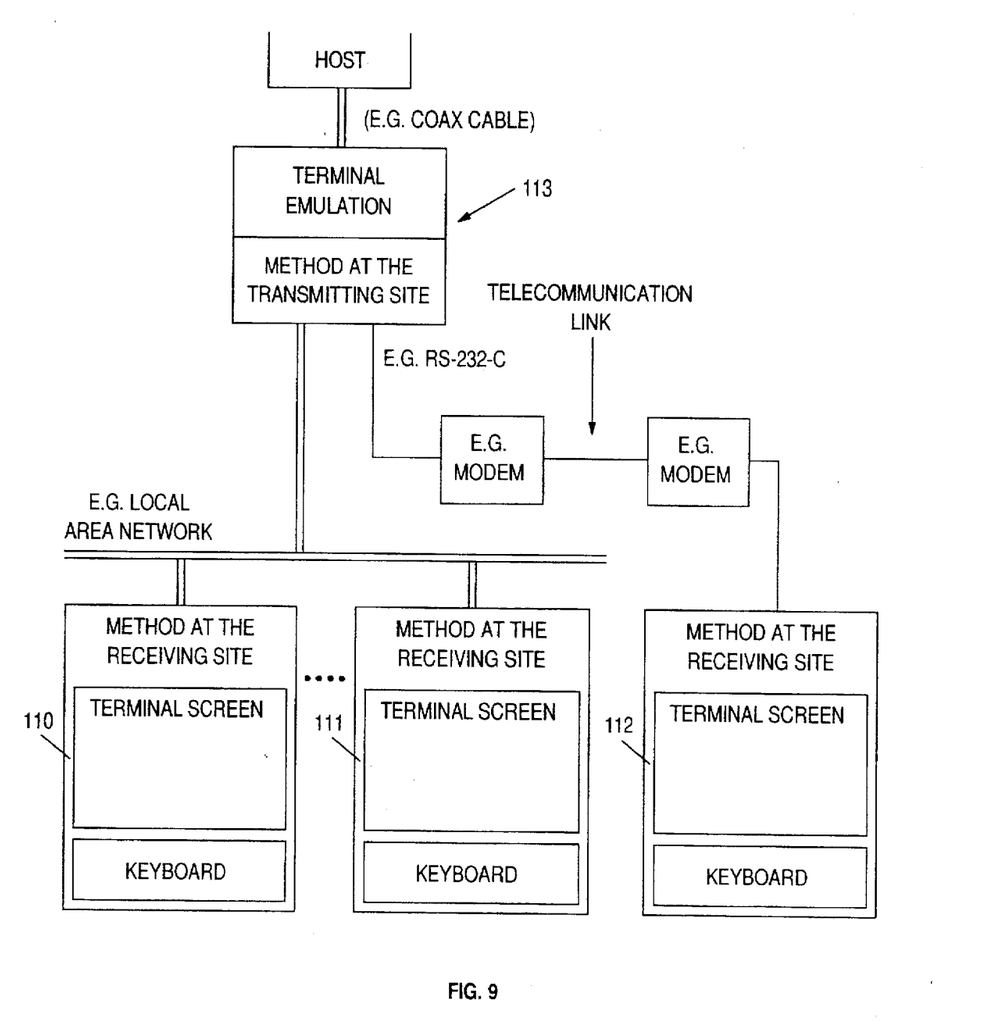
FIG. 9 shows the application of the method of the present invention to multiple "remote" sites which are interconnected via a Local Area Network (LAN).

The method according to the invention also allows that multiple "remote" sites 110, 111 and 112 receive a data set and keep it up to date (FIG. 9). This is accomplished by sending the update information to so-called group addresses.

The transmitting site 113 can send out so-called full information packets which fully describe the data set, or so-called delta information packets which describe the difference between the data set at the current time stage and the data set at the previous time stage.

Because a "remote" site 110, 111 or 112 could become active a long time after the transmitting site 113 is started, receiving sites 110, 111 or 112 can request that the transmitting site 113 sends out a full information packet so the receiving site 110, 111 or 112 can initialize its data set. Other receiving sites 110, 111 or 112 that are "in sync" with the transmitting site 113 may ignore this unwanted information packet.

Receiving sites 110, 111 or 112 may get into a situation where they cannot process the incoming information packets in time and so they encounter missing-sequence numbers. In that case they may wait a short time and then they send a request to the transmitting site 113 in order to obtain a new full information packet for re-synchronization.

Every time the full information packet is generated at the transmitting site 113, the transmitting site employs the additional storage means 37, which is zeroed out, and re-uses the last used sequence number. In this way, receiving sites are "in sync" at the next delta information packet.

However, the method according to the present invention is also applicable to column-oriented data sets, which are only rotated by 90° compared with line-oriented data sets. All the method steps are also available for that kind of data sets in this sense. Column-oriented data sets play a role e.g. for horizontally scrolled graphic data or languages which are written in a vertical line.

I claim:

1. A method for updating line-oriented data sets of characters in a receiving data processing unit with respect to timely occurring changes of said data sets in a transmitting data processing unit, comprising the steps of:
   providing for each of said data processing units at least two data structures which keep the states of the data sets at different time intervals and which are filled alternatingly with the data sets;
   at the transmitting data processing unit,
      comparing the data sets provided in said data structures in order to locate changed and unchanged lines;
      in case of changed lines, determining for the data sets of the later time interval whether said changed lines are blank lines, and if not, determining whether said changed lines are moved lines with respect to at least another line contained elsewhere in the data set of the previous time interval;
      generating updated information with respect to said changed and unchanged lines;
   transferring said updated information from the transmitting data processing unit to the receiving data processing unit;
   receiving said updated information at the receiving data processing unit; and
   applying said updated information to the data structures provided at the receiving data processing unit in order to generate updated data sets.

2. A method for updating line-oriented data sets of characters in a receiving data processing unit with respect to timely occurring changes of said data sets in a transmitting data processing unit, said method comprising the steps of:
   providing for each of said data processing units at least two data structure which keep the states of the data sets at different time intervals and which are filled alternatively with the data sets;
   at the transmitting data processing unit,
      comparing the data sets provided in said data structures in order to locate changed and unchanged lines;
      in case of changed lines, determining for the data sets of the later time interval whether said changed lines are blank lines, and if not, determining whether said changed lines are moved lines with respect to at least another line contained elsewhere in the data set of the previous time interval;
      locating unchanged parts of lines at identical line positions;
      locating, in the data sets of the later time interval, repetitive parts within lines;
      generating update information with respect to said changed and unchanged lines or parts of lines, respectively;
   transferring said update information from the transmitting data processing unit to the receiving data processing unit;
   receiving the update information at the receiving data processing unit; and
   applying said update information to the data structures provided at the receiving data processing unit in order to generate updated data sets.

3. A method for updating line-oriented data sets of pixel graphics in a receiving data processing unit with respect to timely occurring changes of said data sets in a transmitting data processing unit, said method comprising the steps of:
   providing for each of said data processing units at least two data structures which keep the states of the data sets of pixel graphics at different time intervals and which are filled alternatively with the data sets of pixel graphics,
   at the transmitting data processing unit,
      comparing the data sets of pixel graphics provided in said data structures in order to locate changed and unchanged lines;
      in case of changed lines, determining for the data sets of the later time interval whether said changed lines are filled with pixels having identical attributes, and if not, determining whether said changed lines are moved lines with respect to at least another line contained elsewhere in the data set of the previous time interval;
      generating updated information with respect to said changed and unchanged lines;
   transferring said updated information from the transmitting data processing unit to the receiving data processing unit; and
   applying said updated information to the data structures provided at the receiving data processing unit in order to generate updated data sets.

4. A method for updating line-oriented data sets of pixel graphics in a receiving data processing unit with respect to timely occurring charges of said data sets in a transmitting data processing unit, said method comprising the steps of:
   providing for each of said data processing units at least two data structures which keep the states of the data sets of pixel graphics at different time intervals and which are filled alternatingly with the data sets of pixel graphics, at the transmitting data processing unit, comparing the data sets of pixels provided in said data structures in order to locate changed and unchanged lines;

in case of changed lines, determining for the data sets of the later time interval whether said changed lines are filled with pixels having identical attributes, and if not, determining whether said changed lines are moved lines with respect to at least another line contained elsewhere in the data set of the previous time interval;

locating unchanged parts of lines at identical line positions;

locating, in the data sets of the later time interval, repetitive parts within lines;

generating update information with respect to said changed and unchanged lines;

transferring said update information from the transmitting data processing unit to the receiving data processing unit; and applying said update information to the data structures provided at the receiving data processing unit in order to generate updated data sets.

5. The method according to one of claims 1 to 4 wherein changed lines, if not a moved line, are encoded as new lines.

6. The method according to one of claims 1 to 4 wherein unchanged lines at the receiving site are taken from the data structure which keeps the data set of the older time interval.

7. The method according to one of claim 1 to 4 wherein said updated information for unchanged lines is provided by change flags.

8. The method according to one of claims 1 to 4 wherein the steps being performed at the transmitting site are executed by exploiting hash values.

9. The method according to claim 8, wherein hash values are formed by more than two sets of four ASCII characters or by more than two sets of 4-byte machine words.

10. The method according to claim 8, further comprising the steps of:

picking up data at a fixed position within a line and getting their attributes;

filling up one machine word with the attributes of these data; and comparing this machine word with the line split up into machine word representation.

11. The method according to one of claims 1 to 4, wherein multiple consecutive moved lines or multiple consecutive lines with only repetitive data are encoded as a block of lines containing only repetitive data.

12. The method set forth in one of claims 1 to 4, further comprising the step of providing an additional data structure for initializing the data structures at the receiving site or for re-synchronizing the transmitting site.

13. The method according to one of claim 1 to 4, wherein the transmitted information carries sequence numbers.

14. Application of the method according to one of claimed 1 to 4 to text mode terminals.

15. Application of the method according to one of claims 1 to 4 to raster graphic terminals.

16. A method for determining changes in line-oriented data sets of characters or pixel graphics in a data processing unit with respect to timely occurring changes of said data set, said method comprising the steps of:

providing, in said data processing unit, two data structures which keep the states of the data sets at different time intervals and which are filed with the data sets;

comparing the data sets provided in said data structures in order to locate changed and unchanged lines;

in case of changed lines, determining for the data sets of the later time internal whether said changed lines are blank lines, and if not, determining whether said changed lines are moved lines with respect to at least another line contained elsewhere in the data set of the previous time interval; and generating updated information with respect to said changed and unchanged lines.

17. The method of claim 16 wherein the data processing unit includes a transmitting data processing unit.

18. The method of claim 17 further including the steps of transmitting the updated information.

19. The method of claim 18 wherein the data processing unit further includes a receiving data processing unit.

20. The method of claim 19 further including the steps of providing, in said receiving data processing units, at least two data structures which keep the states of data sets at different time intervals;

receiving, at said receiving data processing unit, the update information; and applying said update information to the data structures provided at the receiving data processing unit in order to generate updates data sets.

* * * * *